Patented Sept. 15, 1942

2,295,866

UNITED STATES PATENT OFFICE 2,295,866

RUBBER CEMENT AND METHOD OF MAKING

Lester A. Riefenstahl, Wabash, Ind., assignor to The General Tire & Rubber Co., Akron, Ohio, a corporation of Ohio No Drawing. Application October 26, 1939, Serial No. 301,403

2 Claims. (Cl. 260—759)

This invention relates to adhesive unmasticated rubber solutions and to a method of preparing the same. It particularly relates to quick drying rubber cements having relatively high tensile strength such as that of unmasticated rubber.

Cements prepared from latex have low viscosity and produce films having comparatively high strength and superior aging properties. Being aqueous dispersions, however, latex cements are disadvantageous and are often unsuitable because of the long time required for drying. It is, therefore, desirable to produce rubber cement having the film strength of the rubber in latex and having the comparatively short drying time obtained with cements having rubber dissolved in petroleum rubber solvents, etc.

Rapid drying cements containing unmasticated rubber dissolved in volatile solvents have heretofore been produced by intimately mixing latex with an aqueous emulsion of a rubber solvent and then adding a coagulent such as alcohol or the like. In the preparation of such cements, however, a considerable portion of an emulsifying agent, soap, etc., has been used in order to prepare an aqueous dispersion of the rubber solvent and it has been found that such colloid, of which ammonium oleate is an example, adversely affects the tackiness of the cement so that its adhesive properties are substantially decreased.

It is an object of this invention to provide quick drying cements made from unmasticated rubber and having high adhesive properties and a high degree of tackiness when wet.

It is a further object of this invention to provide a method of making rubber cements having high tensile strength, wherein rubber latex and a rubber solvent are combined together without the addition of a protective colloid or an emulsifying agent.

It is a further object of this invention to provide a method of making a quick drying rubber cement from rubber latex and a rubber solvent, which is not miscible with water, without preparing an aqueous emulsion of the rubber solvent.

It is a still further object of this invention to provide a rubber cement having rubber latex and a rubber solvent and having the water of the latex or added water intimately dispersed throughout the whole mass without adding a soap or colloid material.

According to the present invention, rubber cements are made by agitating an aqueous dispersion of rubber and a rubber solvent together without the addition of protective colloids or emulsifying agents. By the agitation the solvent is driven through the film of water surrounding the rubber globules of the latex so as to come into contact with the rubber. Since the rubber is in such a finely divided state, it swells rapidly upon contact with the solvent and forms a continuous phase of rubber cements which envelopes the water present in such a manner that it forms a homogeneous mass having the water uniformly dispersed therein.

In the production of the cement the latex and solvent are preferably added to a container having means for producing intense agitation of its contents and for providing an inert atmosphere to reduce the hazard due to the inflammability of the solvent. A super atmospheric pressure is advantageous in the agitating compartment as it may be used to rapidly force the comparatively viscous liquid out of the container through pipes and valves and thus facilitate operation of the equipment used.

Any suitable means for producing intense agitation of the liquid may be used, but apparatus having two or more beaters adapted to rotate and produce impact between portions of the agitated fluid at one or more points is preferred. It has been found that when the beaters are arranged so as to produce a strong flow of the two liquids through the interface between the two layers of the fluids, as is produced when the axes of rotation of the agitators is parallel to the normal surfaces of the liquids, the time required for the formation of the cements is relatively less than when the major flow of the fluids is parallel to their normal surface as is the case when the axes of the beaters is perpendicular to the surface of the liquids.

The time required for agitating the mixture depends on the agitating apparatus used, but with intense agitation such, for example, as is produced by the apparatus described in Patent No. 1,904,952, less than a minute or so is usually sufficient.

The quantity and concentration of latex used may be varied to a considerable extent and depends upon the viscosity desired in the final mix and upon the quantity of water desired in the cement. With the more dilute latices a correspondingly larger proportion should be used to obtain cements of the same viscosity. The dilution of the latex with water should not be carried to such an extent that a continuous film is not formed however. Generally latices having more than 15% of rubber solids are preferred for most applications although latices having as low as about 10% of rubber solids may be used for the preparation of cement. The latex may be a concentrated latex or a natural latex with various preserving agents. It is preferred, however, to use a latex such as Revertex which is a latex concentrated by evaporation and preserved with an alkaline material such as sodium hydroxide, etc.

The solvent may be any of the common rubber solvents, such as naphtha, benzene, carbon tetrachloride, and the like, but petroleum rubber solvents are generally preferred because of their relatively low cost. The quantity of solvent used obviously depends upon the viscosity desired. When a non-inflammable cement is desired a suitable portion of a solvent may be carbon tetrachloride or other non-inflammable rubber solvent.

Since in the preparation of the cement as set forth, a protective colloid has not been added to the latex or to the rubber solvent, cements of superior tackiness are obtained. However, it has been found that the tackiness and adhesive properties may be still further increased by the addition of tack producing materials, such as rosin, hydrogenated rosin, etc., to the cement. The unsaponified tack producing materials are preferred, as the usual saponified materials are water soluble and appear to be preferentially absorbed in the aqueous or disperse phase of the cement. They are therefore less effective. The unsaponified materials preferably used to improve tackiness are the long chain acids or distillation residues of an acidic tar or resinous nature but hydrocarbons and non-acidic tars and resins are also effective. Rosin is but sparingly soluble in petroleum solvents, but the small amount added before saturation of the solvent occurs has been found to increase the tackiness of the cement substantially.

The rosin or other non-saponified tack producing material may be added if desired in finely pulverized form to the thick rubber gel described above, but it is preferably added in liquid form, dissolved in the rubber solvent before or after the solvent is added to the latex. The rosin may be present in sufficient quantities to saturate the solvent but it has been found that about 2 to 5% of rosin is desirable to produce a cement having superior properties.

The following examples illustrate the preparation of adhesive composition according to this invention.

Example I

Two gallons of a petroleum rubber solvent such as benzine are added to forty ounces of 60% latex and intensely agitated in a closed container having an atmosphere of carbon dioxide at atmospheric pressure. The agitation apparatus contained two oppositely rotating beaters having horizontal axes and after an agitation of twenty-five seconds a homogeneous cement having a disperse phase of water and a continuous phase of rubber swollen by solvent was produced. The cement was forced out of the container through an orifice by increasing the pressure of the gas in the container and was found to become more viscous after standing a few minutes at atmospheric pressure.

When about eight ounces of rosin is added to the solvent used in the preparation of the cement, the tackiness of the cement produced is improved so that its property of adhering to leather and other substances while wet is increased.

Example II

A non-inflammable cement was prepared by agitating ½ gallon of gasoline and 1½ gallons of carbontetrachloride with 40 ounces of Revertex having a rubber concentration of about 60% rubber solvent. The agitating apparatus used is described in the Russell Patent No. 1,940,952, and after an agitation of thirty-five seconds a thick gel having rubber swollen with solvent as a continuous phase and containing water of the latex an intimate association was obtained.

The rubber latex in the above examples may be substituted by natural or artificial aqueous dispersions of rubber, balata, gutta percha or artificial aqueous dispersions of synthetic rubber, etc., to produce cements having a diversity of properties. Any of the aforesaid dispersions may contain the usual compounding and vulcanizing ingredients in suitable concentration if desired.

Since in the preparation of cements, in accordance with this invention, the addition of an emulsifying agent is not required, improved tackiness is obtained even without the use of acidic tack producing material such as rosin and the like or its equivalent. The cements produced had a continuous phase of rubber swollen by solvent, contained water substantially homogeneously admixed therein, were stable over long periods of time, and had high film strength.

Various modifications may be made in the above described process without departing from the principles of the invention herein set forth, and it is my intention not to limit the appended claims except as may be necessitated by the prior art.

What I claim is:

1. A homogeneous rubber cement having a continuous phase of rubber swollen by solvent, comprising rubber latex and a petroleum rubber solvent which contains 2% to 5% of rosin.

2. A method of making a tacky rubber cement which comprises dissolving at least 2% of rosin in a rubber solvent and agitating the rubber solvent with latex to form a homogeneous mixture and to swell the rubber particles into a continuous phase of rubber swollen by solvent and having a disperse phase of water.

LESTER A. RIEFENSTAHL.